(12) United States Patent
Moake et al.

(10) Patent No.: US 8,791,407 B2
(45) Date of Patent: Jul. 29, 2014

(54) GAMMA-GAMMA DENSITY MEASUREMENT SYSTEM FOR HIGH-PRESSURE, HIGH-TEMPERATURE MEASUREMENTS

(75) Inventors: Gordon Layne Moake, Houston, TX (US); Daniel P. Kusmer, Stafford, TX (US); Wesley Neil Ludwig, Fort Worth, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 773 days.

(21) Appl. No.: 13/029,674

(22) Filed: Feb. 17, 2011

(65) Prior Publication Data

US 2011/0204216 A1  Aug. 25, 2011

Related U.S. Application Data

(60) Provisional application No. 61/307,627, filed on Feb. 24, 2010.

(51) Int. Cl.
*G01V 5/12* (2006.01)

(52) U.S. Cl.
USPC ............ 250/269.3; 250/236.1; 250/269.7; 250/265; 250/266; 250/253; 250/257

(58) Field of Classification Search
CPC ........... G01V 5/04; G01V 5/12; G01V 5/104; G01V 5/10; G01V 5/125; G01V 5/107; E21B 47/102
USPC ................................................ 250/269.3
See application file for complete search history.

(56) References Cited

U.S. PATENT DOCUMENTS

| | | | | |
|---|---|---|---|---|
| 3,864,569 A | * | 2/1975 | Tittman | 250/264 |
| 4,661,700 A | * | 4/1987 | Holenka | 250/267 |
| 4,958,073 A | * | 9/1990 | Becker et al. | 250/269.3 |
| 5,508,514 A | * | 4/1996 | Sallwasser et al. | 250/266 |
| 5,608,215 A | * | 3/1997 | Evans | 250/269.6 |
| 5,841,135 A | * | 11/1998 | Stoller et al. | 250/269.3 |
| RE36,012 E | * | 12/1998 | Loomis et al. | 250/269.4 |
| 6,300,624 B1 | * | 10/2001 | Yoo et al. | 250/254 |
| 6,308,561 B1 | | 10/2001 | Samworth et al. | |
| 6,754,586 B1 | * | 6/2004 | Adolph et al. | 702/8 |
| 6,995,684 B2 | * | 2/2006 | Clark | 340/854.6 |
| 7,148,471 B2 | * | 12/2006 | Roscoe et al. | 250/269.2 |
| 7,151,254 B2 | * | 12/2006 | Mickael | 250/269.3 |
| 7,285,772 B2 | * | 10/2007 | Labous et al. | 250/269.1 |
| 7,800,052 B2 | * | 9/2010 | Gadot | 250/261 |
| 7,960,687 B1 | * | 6/2011 | Simon et al. | 250/269.1 |
| 8,076,634 B2 | * | 12/2011 | Stoller | 250/269.1 |
| 8,299,420 B2 | * | 10/2012 | Stoller | 250/269.4 |
| 8,421,004 B2 | * | 4/2013 | Molz et al. | 250/254 |
| 2004/0020646 A1 | * | 2/2004 | Flecker et al. | 166/253.1 |
| 2004/0065823 A1 | * | 4/2004 | Mickael | 250/254 |

(Continued)

*Primary Examiner* — David Porta
*Assistant Examiner* — Djura Malevic
(74) *Attorney, Agent, or Firm* — Squire Patton Boggs LLP (57) ABSTRACT

A downhole gamma ray density measurement system is described. The gamma ray density measurement system includes a pressure housing and a gamma ray source within the pressure housing. One or more detectors within the pressure housing detect gamma radiation. One or more low-attenuation inserts may be located in the pressure housing near the gamma ray source and/or one or more of the detectors. One or more high-attenuation inserts may be located in the pressure housing near the gamma ray source and/or one or more of the detectors.

30 Claims, 4 Drawing Sheets

(56) References Cited

U.S. PATENT DOCUMENTS

| | | | |
|---|---|---|---|
| 2004/0104821 A1* | 6/2004 | Clark | 340/854.6 |
| 2006/0065824 A1* | 3/2006 | Mickael | 250/252.1 |
| 2006/0102834 A1* | 5/2006 | Mickael | 250/269.1 |
| 2009/0057545 A1* | 3/2009 | Saenger et al. | 250/269.4 |
| 2009/0147907 A1* | 6/2009 | Wraight | 378/1 |
| 2009/0283691 A1* | 11/2009 | Stoller | 250/390.1 |
| 2010/0193675 A1* | 8/2010 | Stoller | 250/254 |
| 2010/0252725 A1* | 10/2010 | Stewart | 250/269.3 |
| 2011/0198488 A1* | 8/2011 | Stoller et al. | 250/258 |
| 2011/0238313 A1* | 9/2011 | Thornton et al. | 702/8 |

* cited by examiner

GAMMA-GAMMA DENSITY MEASUREMENT SYSTEM FOR HIGH-PRESSURE, HIGH-TEMPERATURE MEASUREMENTS

CROSS-REFERENCE TO RELATED APPLICATIONS

This application claims priority to U.S. Provisional Patent Application No. 61/307,627, filed Feb. 26, 2010, the contents of which is incorporated by reference herein in its entirety.

TECHNICAL FIELD

This invention relates, in general, to gamma ray density measurement logging, and, in particular, to systems and methods for providing density and photoelectric factor measurements that minimize o-ring use and simplify replacement of o-rings, and that reduce sensitivity to borehole effects on the measurements.

BACKGROUND

The use of gamma ray scattering measurements to measure the density of subsurface formations is well-known. Tools consist of a gamma-ray source and at least one detector. The earliest single detector tools were soon replaced by dual detector tools that allow compensations to be made for the possible intervening presence of mud or drilling fluid between the tool and the formation. Gamma rays from the source pass into the formation where they interact with electrons in the formation material. Some of the gamma rays eventually scatter back into the tool and are detected by instrumentation. The number of detected gamma rays depends on the number of electrons in the formation, and the number of electrons is proportional to the density of the formation. Consequently, the formation density can be determined from the number of detected gamma rays.

Modern tools also measure the energy of the detected gamma rays. Whereas high-energy gamma rays are primarily affected by simple scattering off of electrons (Compton scattering), low-energy gamma rays are affected both by Compton scattering and by photoelectric absorption. The industry has devised a quantity that exemplifies the amount of photoelectric absorption of a formation. That quantity, called the Photoelectric Factor and referred to as Pe, can be computed by combining the number of high-energy gamma rays and low-energy gamma rays that are detected by a particular sensor. Consequently, by measuring the energy of detected gamma rays, modern tools compute both the density and the Pe of the formation.

Gamma ray density measurement logging is typically performed by lowering an instrument down a borehole and recording gamma radiation at various depths. The instrumentation is surrounded by a pressure housing to protect it from the high pressures and the fluid encountered in the borehole. Density logs, which are the result of the series of gamma radiation measurements, are affected by the diameter of the borehole and the properties of the fluid filling the borehole.

Current gamma ray density measurement logging tools typically use "windows" in the pressure housing. Windows increase the transmission of gamma radiation into detectors. Each window, however, may require one or more o-rings to form a seal with the pressure housing, which is required to maintain the pressure barrier between the instrumentation and borehole. O-rings at high borehole pressures and temperatures are a liability. The o-rings must be changed often, especially after high-pressure, high-temperature jobs. Thus, it is best to have as few necessary o-rings as possible, and to ensure that they are easy to change. In existing systems, o-rings around windows are typically difficult to replace. In addition, the way that the o-rings must be implemented makes them a risk; it is possible for external pressures to extrude the o-rings out of position within grooves, resulting in a failure.

Existing systems provide a chemical source of gamma rays, which interact with the formation. Detectors then detect the resulting interaction and the interaction is analyzed to determine characteristics of the formation. Many existing systems, however, suffer from sensitivity to gamma radiation from the borehole.

BRIEF DESCRIPTION

Certain embodiments of the present invention may provide systems and methods for providing accurate, precise density and photoelectric factor measurements that minimize o-ring use and simplify replacement of o-rings.

Embodiments of the present invention may include a downhole gamma ray density measurement system. The downhole gamma ray density measurement system may include a pressure housing. At least one detector within the pressure housing may detect gamma radiation. One or more inserts in the pressure housing may be made of at least one low gamma ray attenuating material.

In certain embodiments, the pressure housing may not include windows. In some embodiments, the one or more inserts may be made of beryllium oxide. In certain embodiments, at least one insert may be positioned near the gamma ray source and/or near at least one detector. In some embodiments, the pressure housing may be made of a titanium alloy. In certain embodiments, the gamma ray source may be coupled to the pressure housing at an angle other than perpendicular to the surface of the pressure housing. Some embodiments may include a first o-ring above the far detector and a second o-ring below the gamma ray source. Certain embodiments may include gamma ray shielding inside the pressure housing. In some embodiments, a collimator may be positioned in the gamma ray shielding near the gamma ray source and/or near at least one detector. In certain embodiments, a support may be located between a collimator and the pressure housing.

Embodiments of the present invention may include a downhole gamma ray density measurement system. The downhole gamma ray density measurement system may include a housing and a gamma ray source positioned within the housing. At least one detector within the housing may detect gamma radiation. One or more inserts in the housing may be made of at least one high gamma ray attenuating material.

In certain embodiments, some or all of the housing may be made of a titanium alloy. In some embodiments, the one or more inserts may be made of tungsten. In certain embodiments, at least one insert is positioned near the source and/or at least one detector. In some embodiments, the housing may be enlarged near the gamma ray source and/or near at least one detector.

Embodiments of the present invention may include a downhole density measurement method. The method may include disposing a gamma ray density measurement system within a borehole, the gamma ray density measurement system comprising a pressure housing, a gamma ray source positioned within the pressure housing, at least one detector within the pressure housing for detecting gamma radiation; and one or more inserts in the pressure housing, wherein the one or more inserts comprises at least one low gamma ray attenuating material. The method may also include measuring gamma radiation with the at least one detector.

In certain embodiments, the pressure housing does not include windows. In some embodiments, the one or more inserts may be made of beryllium oxide. In certain embodiments, at least one insert may be positioned near the gamma ray source and/or at least one detector. Certain embodiments may include gamma ray shielding inside the pressure housing.

Embodiments of the present invention may include a downhole density measurement method. The method may include disposing a gamma ray density measurement system within a borehole, the gamma ray density measurement system comprising a housing, a gamma ray source positioned within the housing, at least one detector within the housing for detecting gamma radiation; and one or more inserts in the housing, wherein the one or more inserts comprises at least one high gamma ray attenuating material. The method may also include measuring gamma radiation with the at least one detector.

In certain embodiments, at least one insert may be positioned near the source and/or at least one detector. In some embodiments, the housing may be enlarged near the gamma ray source and/or at least one detector.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF CERTAIN EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Embodiments of the present invention may provide a gamma-gamma density measurement system. The gamma-gamma density measurement system may operate at very high pressures and temperatures, while making accurate and precise density and photoelectric factor (Pe) measurements. In certain embodiments, the gamma-gamma density measurement system may have a minimum number of necessary o-rings, and any o-rings present may be easy to replace. Generally, o-rings at high borehole pressures and temperatures are a liability, and they must be changed often after high-pressure, high-temperature jobs. Thus, it is preferable to have a minimum number of necessary o-rings, and to ensure that any o-rings present are easy to change.

Figure 1:
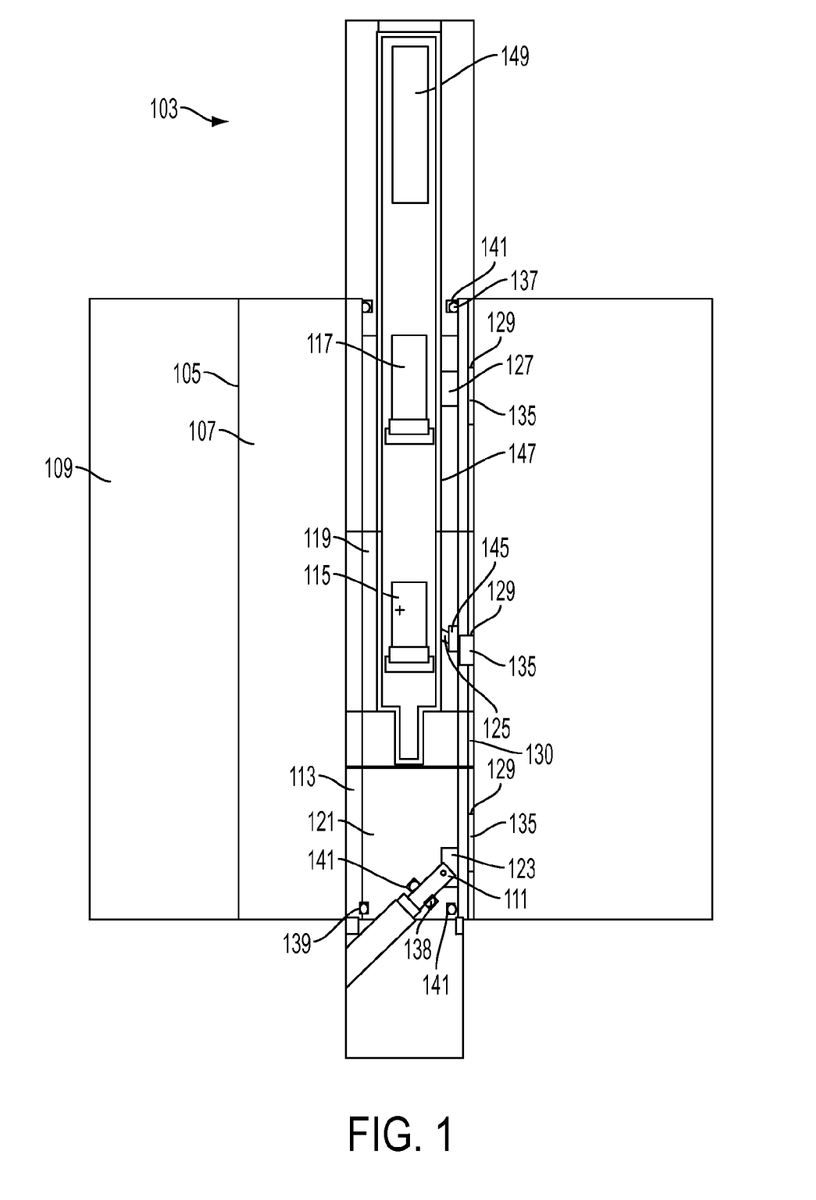
FIG. 1 is a side view of an exemplary density measurement tool according to an embodiment of the present invention.

FIG. 1 shows an exemplary embodiment of the present invention. A sensor package or pad 103 may be a portion of a gamma-gamma density measurement system or may be deployed from a main body of the gamma-gamma density measurement system. The sensor package or pad 103 may be pushed against a borehole wall 105 of a borehole 107 within a formation 109. The sensor package or pad 103 may house a gamma ray source 111 within a pressure housing 113.

Embodiments of the present invention may use gamma rays that originate within the system. The gamma rays may have a high enough energy to exit the system, pass through the formation 109, and reenter the system in sufficient quantity that the detected gamma rays yield a statistically meaningful result. Also, the gamma ray source 111 preferably has a reasonably long half life, so that it does not need to be frequently replaced. Cesium-137 may be a preferred choice. Cobalt 60 may also be used, but it has a shorter half life and may require more shielding. An electron accelerator could also be used to generate gamma rays. An electron accelerator or similar source could be turned on and off electronically.

The sensor package or pad 103 preferably also houses two detectors, a near detector 115 and a far detector 117. The detectors 115, 117 may be capable of measuring gamma rays ranging from approximately 40 keV to approximately 1 MeV at high count rates and sort the gamma rays into energy ranges. Scintillation crystals coupled to photomultiplier tubes may be preferred. An exemplary cost effective crystal may be NaI, although there are many other crystals that may be used, notably $LaBr_3$. Additional or fewer than two detectors may be present depending on particular uses. Dimensions may be a tradeoff between efficiency, pressure rating, and temperature rating. Relative spacing of the detectors 115, 117 from the gamma ray source 111 may determine how effectively information from the detectors 115, 117 can be combined to minimize mudcake or standoff effects. Standoff may be defined as a distance from a front of the sensor package or pad 103 to the borehole wall 105. Preferably, the standoff is as close to zero as possible. The sensor package or pad 103 may be pushed against the borehole wall 105 to minimize standoff. Mudcake may be defined as a condensed version of the mud that may keep the pad from touching the formation wall.

The sensor package or pad 103 may have shielding 119, which serves to block gamma rays from entering the detectors 115, 117 from the borehole side of the tool. The sensor package or pad 103 may also have shielding 121 around the source 111 to block gamma rays from traveling directly from the gamma ray source 111 to the detectors 115, 117. The shielding 119,121 may have a high density and large atomic number, and preferably is machinable. A preferred material may be tungsten alloy SD175H.

A source collimator 123 in the shielding 121 near the gamma ray source 111 may allow gamma rays to pass out of the pressure housing 113 and into the formation 109. A near collimator 125 in the shielding 119 around the near detector 115 may allow gamma rays to pass into the near detector 115 from a targeted portion of the formation 109. A far collimator 127 in the shielding 119 around the far detector 117 may allow gamma rays to pass into the far detector 117 from a targeted portion of the formation 109. Collimators may be voids in the shielding 119. The source collimator 123 may minimize attenuation for gamma rays that are emitted from the gamma ray source 111 toward the front of the sensor package of pad 103 and into the formation 109, and whose path may take them closer to the detectors 115, 117. The detector collimators 125, 127 may select gamma rays that may hit a center region of an active-portion of the detectors 115, 117.

The pressure housing 113 around the gamma ray source 111 and the detectors 115, 117 may keep the interior of the sensor package or pad 103 at atmospheric pressure, regardless of the surrounding pressure. The pressure housing 113 may be hard, so as to resist wear. The pressure housing thickness may depend on the diameter of the system, the system pressure rating, and the alloy used. Wear plates 130 may be located on a front of the sensor package or pad 103. The wear plates 130 may be made of steel or a similar material. The wear plates 130 may hold one or more inserts 135 over the collimators 123, 125, 127 in place. The wear plates 130 may protect the sensor package or pad 103 from wear and may be easily replaced. The near detector 115 and the far detector 117 may measure gamma rays from the gamma ray source 111.

In previous systems, windows in a pressure housing covered any collimators to let gamma rays pass through the collimators with a minimum amount of attenuation. A pressure seal was then necessary around windows. Windows were present near any source and any detectors. Windows that passed through the pressure housing had associated o-rings that sealed against pressure from the outside of the pressure housing.

In certain embodiments of the present invention, as shown in FIGS. 1-5, o-rings around windows in the pressure housing near the collimators 123, 125, 127 are eliminated, as are the windows. Any o-rings around windows are difficult to replace. In addition, the way that any such o-rings must be implemented makes them a risk; it is possible for external pressures to extrude the o-rings out of their groove, resulting in a failure.

As shown in FIGS. 1-5, to eliminate o-rings that seal windows, windows passing through the pressure housing 111 are also eliminated. To minimize the effect of removing the windows, the pressure housing 113 may be made of a strong material with a low density. Embodiments of the present invention may use titanium alloy Ti Beta 38-6-44 (170 ksi min yield). Stainless steel, such as 17-4PH SST may also be used, but it may not pass as many gamma rays due to its increased density and larger average atomic number. An exemplary pressure housing thickness is approximately 0.39 inches. To protect against high pressures, the pressure housing 113 in certain embodiments may preferably be made of a titanium alloy. Titanium alloys are strong, yet they have a much lower density than iron-based alloys. Titanium alloys also exhibit less photoelectric absorption. Therefore, much greater transmission may be achieved relative to an iron-based alloy. Other similar materials may also be used in certain situations.

To further aid transmission of gamma radiation through the pressure housing 113, material may be removed from the pressure housing 113 proximate to and/or over the collimators 123, 125, 127. One or more cutouts 129 may be machined out of the pressure housing 113. Size may be a tradeoff between strength and gamma transmission. The one or more cutouts 129 may be placed over the collimators 123, 125, 127. The one or more cutouts 129 may be large enough so that gamma rays passing through the collimators 123, 125, 127 may also pass through the one or more cutouts 129. Preferably, the one or more cutouts 129 may not pass entirely through the pressure housing 113.

To keep the one or more cutouts 129 from filling up with mud or drilling fluid, a low density, low attenuation, and low photoelectric-absorption material 135 may be placed in the resulting gaps 129. Beryllium Oxide (BeO) may be a preferred material because it is sufficiently transparent to gamma rays and is very hard, but other similar low attenuation materials may be used. Other materials may include, but are not limited to, beryllium, preferably coated to resist wear, and/or polyether ether ketone (PEEK). Since minimizing the thickness of the pressure housing 113 over the near detector 115 is extremely critical for measuring the photoelectric factor (Pe), a large amount of material may be removed over the near collimator 125. Without additional support, this portion of the pressure housing 113 may collapse under large pressures. To help support the pressure housing 113, a piece of low attenuation material 145, such as BeO, may be embedded in the shielding 119 over the collimator 125. The low attenuation material 145 may be held in place by the pressure housing 113.

A flask 147 and/or electronics 149 may be located within the pressure housing 113. The purpose of the flask is to keep the sensors and electronics contained in the flask at a cooler temperature than the surrounding borehole.

To prevent the source collimator 123 from filling with mud, it may be necessary to extend the pressure housing 113 below the source collimator 123. The pressure housing 113 may be extended at least about one inch below the gamma ray collimator 123 and at least about one inch above the far detector 117. To avoid placing a window in the pressure housing through which to insert the source, the gamma ray source 111 may not be inserted perpendicularly into the sensor package or pad 103, as is normally done. Rather, it may be inserted at an angle, as shown in FIG. 1. The pressure housing 113 may transition to more traditional materials, such as, but not limited to, stainless steel 17-4PH SST, above the far detector 117 and below the gamma ray source 111. A top o-ring 137 and a bottom o-ring 139 may be present at the top and bottom of the pressure housing 113, respectively. In addition, one or more o-rings 138 may be placed in the shielding 121 to seal around the source. Engineering specifications for o-rings may be given in ISO 3601-1:2008. Exemplary material for the o-rings may be fluoroelastomers. The o-rings 137, 138, and 139 may form a pressure seal within the sensor package or pad 103. In certain embodiments, external pressure may collapse the pressure housing 113 around internal material that holds the o-rings 137, 139 in grooves 141, trapping the o-rings 137, 139 in position. The grooves 141 may be machined. Engineering specifications for machining o-ring grooves may be given in ISO 3601-2:2008. Thus, the o-rings 137, 139 may not be able to extrude out of the grooves 141.

For practicality purposes, the o-rings may seal around the circumference of the source. To minimize risk of failure, more than one o-ring may be used. As an added precaution, the source may be located in an isolated section of the pressure housing. In that case, if the seal around the source should fail, the detectors and electronics may not be affected.

The o-rings 137, 138, and 139 may be the only o-rings in this section of the sensor package or pad 103, and they may be relatively easy to change.

When designing a density measuring system, it may be important to measure as many gamma rays as possible in the far detector 117 to reduce the statistical uncertainty of the measurement, which is a feature of any nuclear measurement.

This is difficult in a high-temperature tool, because the detectors 115, 117 must be housed in a flask. The flask may restrict both the diameter of the detectors 115, 117 and how close the detectors 115, 117 can be placed to the source 111, both of which tend to reduce the count rates. This is exacerbated in a high-pressure tool, because the pressure housing 113 must be thicker, which results in smaller detector diameters 115, 117. Thus, it is imperative that the width of the far collimator 127 be as large as possible.

Figure 2:
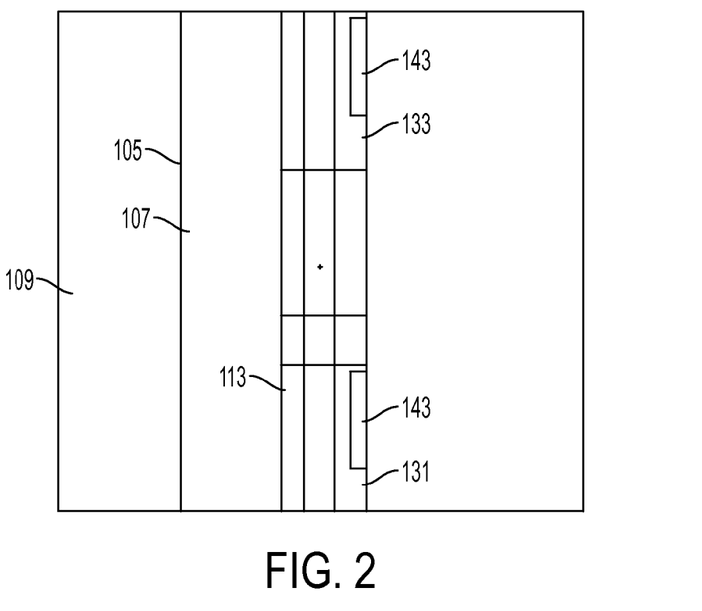
FIG. 2 is a side view of an exemplary density measurement tool with tungsten inserts.
Figure 3:
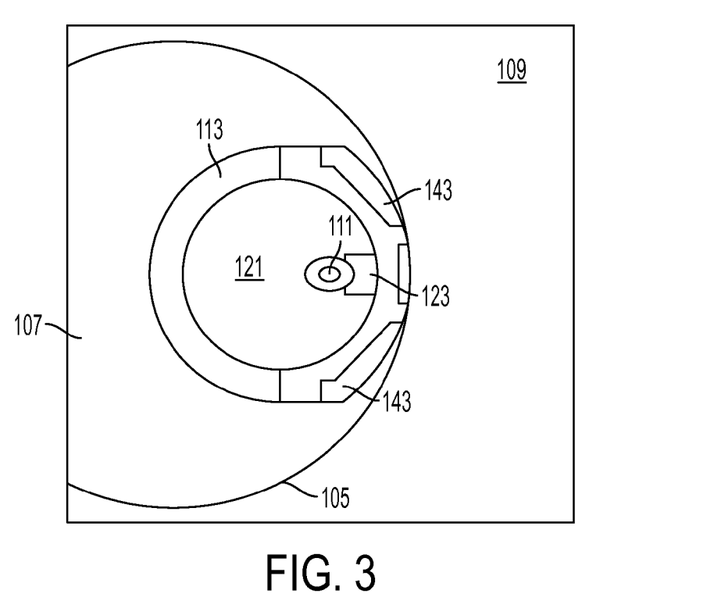
FIG. 3 is a cross section of an exemplary density measurement tool with tungsten inserts around a source.
Figure 4:
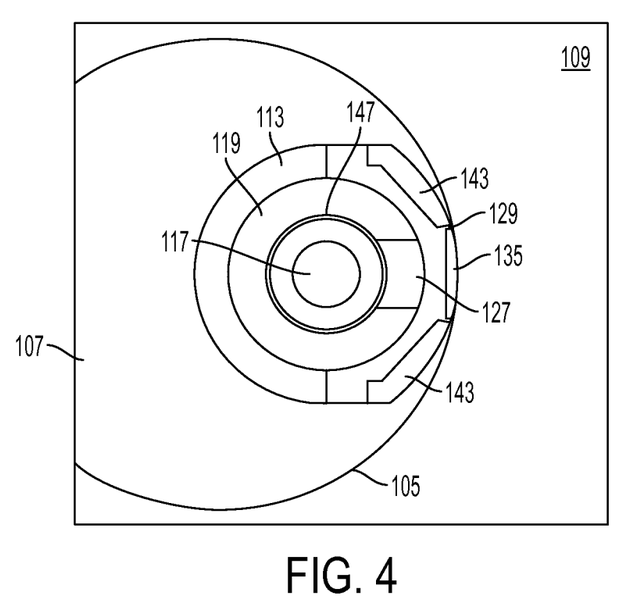
FIG. 4 is a cross section of an exemplary density measurement tool with tungsten inserts around a far detector.

As stated above, titanium and titanium alloys are relatively transparent to gamma rays. Thus, it is possible for gamma rays to enter the side of the density measurement system and scatter through the far collimator 127 and into the far detector 117. The number of such events may depend on the borehole diameter and mud or drilling fluid properties. Since the borehole shape and mud or drilling fluid properties are not always well-known, it is desirable to minimize this dependence. This may be accomplished by enlarging the pressure housing 113 on the detector side of the pressure housing 113 and strategically placing one or more inserts 143 into the pressure housing 113 to control flow of gamma radiation. The one or more inserts 143 preferably have a high density and high atomic number, are relatively hard, and may not melt at borehole temperatures. Generally, the one or more inserts 143 may be as thick as practical. Tungsten may be a preferred material. Steel, depleted uranium, platinum and other materials may also be used. For purposes of this discussion, tungsten inserts are described, however, other similar types of inserts may also be used in particular situations. The inserts may be shaped and installed to block gamma radiation from particular directions and/or sources. The one or more inserts 143 may be positioned in proximity to the source 111 and far detector 117, as shown in FIGS. 2-4, and/or in proximity to the near detector 115. As shown in FIG. 3, the inserts proximate to the gamma ray source 111 may attenuate the gamma rays that enter the borehole through the side of the density measurement system. As shown in FIG. 4, the inserts proximate to the far detector 117 may attenuate gammas that enter through the side of the density measurement system. The inserts may be screwed into the pressure housing 113.

Embodiments of the present invention may be insensitive to the borehole, particularly in comparison to existing systems. That may be due at least in part to the enlarge pressure housing in front of the system and the tungsten inserts.

Figure 5:
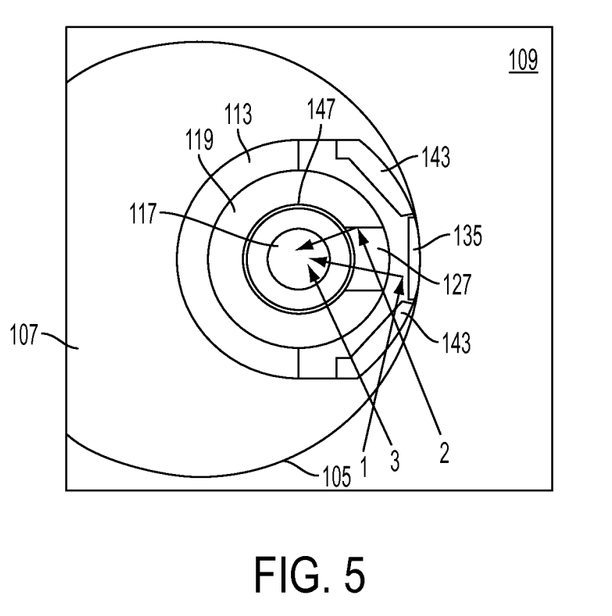
FIG. 5 illustrates exemplary paths of gamma rays that are sensitive to borehole diameter.

FIG. 5 shows one or more inserts 143 over the far detector 117 that may be positioned to block gammas that would otherwise pass into the far detector 117. Paths 1 and 2 represent gamma radiation passing through the far collimator 127, while path 3 represents gamma radiation passing through the side of the density measurement system. By replacing pressure-housing material with one or more inserts 143, the number of gamma rays that travel these paths may be reduced.

Embodiments of the present invention may include the following features: tungsten or other material inserts in the pressure housing; cutouts in the pressure housing that may not pass entirely through the housing, and that are filled with a low-attenuation material; a low-attenuation material in the shielding over a detector to help support the pressure housing; and a source that is screwed into the pad at an angle to avoid a source window and o-rings.

Embodiments of the present invention may have the following: increased reliability due to limited numbers of o-rings; low maintenance costs due to few o-rings to change, and ease of changing the o-rings; accuracy because the device may be insensitive to the borehole; and precision due to relatively high count rates.

Figure 6:
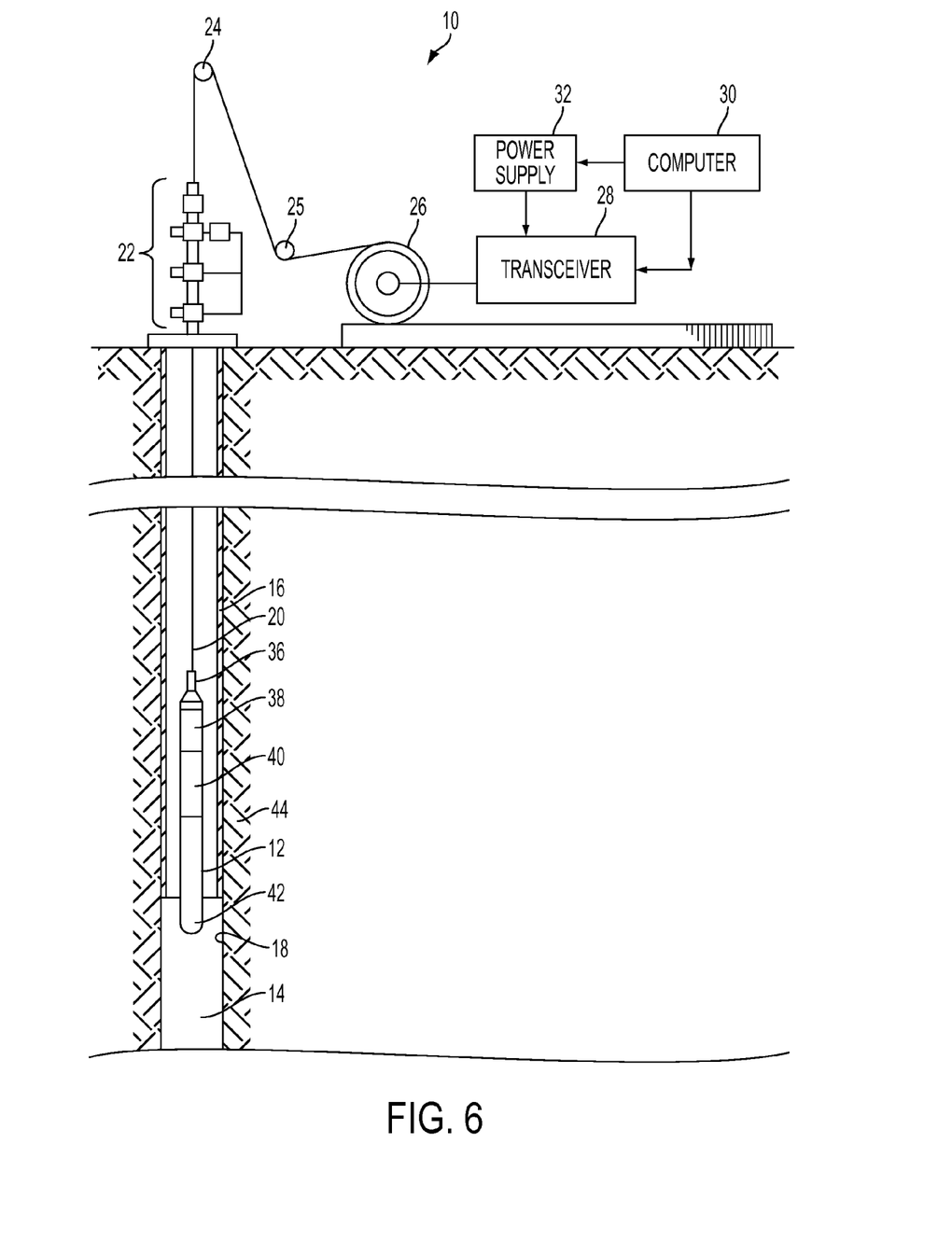
FIG. 6 is a block diagram of a well logging system in accordance with certain embodiments.

Referring to FIG. 6, a well logging system 10 for at least some embodiments of the present invention may include a well logging tool 12 lowered into a borehole 14 by way of a wireline cable 20. The borehole 14 may be cased with concentric casing 16, or the borehole 14 may be an open borehole such as at 18. The cable 20 may extend from the tool 12, through wellhead 22, around a first sheave 24 and around a second sheave 25 to a rotatable spool 26 for raising and lowering the cable 20 and tool 12.

The conductors in cable 20 may be coupled to a transceiver 28. In some embodiments, the conductors in cable 20 are each coupled to a corresponding electrically conductive slip ring (not shown) on the spool axle. The conductive slip rings may transfer electrical currents from the cable that rotates with the spool to corresponding electrically conductive brushes "riding" on the slip rings. The brushes may then be coupled to the transceiver 28. In this manner, signals may be transferred from the rotating spool to the stationary transceiver 28 with negligible degradation.

The transceiver 28 may receive the logging data and information and in turn may transmit the data and information to a computer or microprocessor 30. The computer 30 may analyze the logging data received from the downhole tool 12 and displays the logging information for the operator. The computer 30 may be further configured to provide control signals to transceiver 28 for communication to well logging tool 12. The cable 20 may also be coupled via transceiver 28 to a power supply 32 for supplying power to the logging tool 12. In some embodiments, the power supply 32 is a programmable switching power supply capable of producing adjustable voltages and waveforms under the control of computer 30.

The well logging tool 12 may include a cable head 36 with the upper portion of the tool 12 having suitable electronic circuitry for controlling the supply of power and the transmission of the signals to and from tool 12. The tool 12 may include a motorized unit 40 and an instrument package 42 for collecting the data on the surrounding formation 44. Tool 12 may communicate with surface equipment by way of telemetry and power extraction module (TPEM) 38.

In operation, the well logging tool 12 may be passed downward through the cased section 16 of borehole 14 and into the open portion 18, and then retrieved from the borehole 14 by spooling the cable 20 onto the reel 26. As the well logging tool 12 passes through the borehole 14, information may be collected on the characteristics of the formation 44 surrounding the borehole 14.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A downhole density measurement system comprising:
a pressure housing;
a gamma ray source;
at least one detector within the pressure housing for detecting gamma radiation; and
one or more inserts in the pressure housing within one or more cutouts in the pressure housing, wherein the one or more inserts comprises at least one low gamma ray attenuating material, and wherein the one or more cutouts do not pass entirely through a portion of the pressure housing between the borehole and the gamma ray source or between the borehole and the at least one detector.

2. The system of claim 1, wherein the pressure housing does not include windows.

3. The system of claim 1, wherein the one or more inserts comprise beryllium oxide.

4. The system of claim 1, wherein at least one insert is positioned near the gamma ray source.

5. The system of claim 1, wherein at least one insert is positioned near at least one detector.

6. The system of claim 1, wherein the pressure housing comprises a titanium alloy.

7. The system of claim 1, wherein the gamma ray source is inserted into the pressure housing at an angle other than perpendicular to the surface of the pressure housing.

8. The system of claim 1, further comprising a first o-ring above the at least one detector and a second o-ring below the gamma ray source.

9. The system of claim 1, wherein the source is in an isolated section of the pressure housing.

10. The system of claim 1, further comprising gamma ray shielding inside the pressure housing.

11. The system of claim 10, further comprising a collimator in the gamma ray shielding near the gamma ray source.

12. The system of claim 10, further comprising a collimator in the gamma ray shielding near at least one detector.

13. A downhole density measurement system comprising:
a housing;
a gamma ray source positioned within the housing;
at least one detector within the housing for detecting gamma radiation; and
one or more inserts in the housing within one or more cutouts in the pressure housing, wherein the one or more inserts comprises at least one high gamma ray attenuating material, and wherein the one or more cutouts do not pass entirely through a portion of the pressure housing between the borehole and the gamma ray source or between the borehole and the at least one detector.

14. The system of claim 13, wherein the housing comprises a titanium alloy.

15. The system of claim 13, wherein the one or more inserts comprise tungsten.

16. The system of claim 13, wherein at least one insert is positioned near the source.

17. The system of claim 13, wherein at least one insert is positioned near at least one detector.

18. The system of claim 13, wherein the housing is enlarged near the gamma ray source.

19. The system of claim 13, wherein the housing is enlarged near at least one detector.

20. A downhole density measurement method comprising:
disposing a density measurement system within a borehole, the density measurement system comprising a pressure housing, a gamma ray source, at least one detector within the pressure housing for detecting gamma radiation; and one or more inserts in the pressure housing within one or more cutouts in the pressure housing, wherein the one or more inserts comprises at least one low gamma ray attenuating material, and wherein the one or more cutouts do not pass entirely through a portion of the pressure housing between the borehole and the gamma ray source or between the borehole and the at least one detector; and
measuring gamma radiation with the at least one detector.

21. The method of claim 20, wherein the pressure housing does not include windows.

22. The method of claim 20, wherein the one or more inserts comprise beryllium oxide.

23. The method of claim 20, wherein at least one insert is positioned near the gamma ray source or at least one detector.

24. The method of claim 20, wherein the gamma ray source is inserted into the pressure housing at an angle other than perpendicular to the surface of the pressure housing.

25. The method of claim 20, wherein the gamma ray density measurement system further comprises gamma ray shielding inside the pressure housing.

26. A downhole density measurement method comprising:
disposing a density measurement system within a borehole, the density measurement system comprising a housing, a gamma ray source positioned within the housing, at least one detector within the housing for detecting gamma radiation; and one or more inserts in the housing within one or more cutouts in the pressure housing, wherein the one or more inserts comprises at least one high gamma ray attenuating material, and wherein the one or more cutouts do not pass entirely through a portion of the pressure housing between the borehole and the gamma ray source or between the borehole and the at least one detector; and
measuring gamma radiation with the at least one detector.

27. The method of claim 26, wherein at least one insert is positioned near the source.

28. The method of claim 26, wherein at least one insert is positioned near at least one detector.

29. The method of claim 26, wherein the housing is enlarged near the gamma ray source.

30. The method of claim 26, wherein the housing is enlarged near at least one detector.

* * * * *